UNITED STATES PATENT OFFICE.

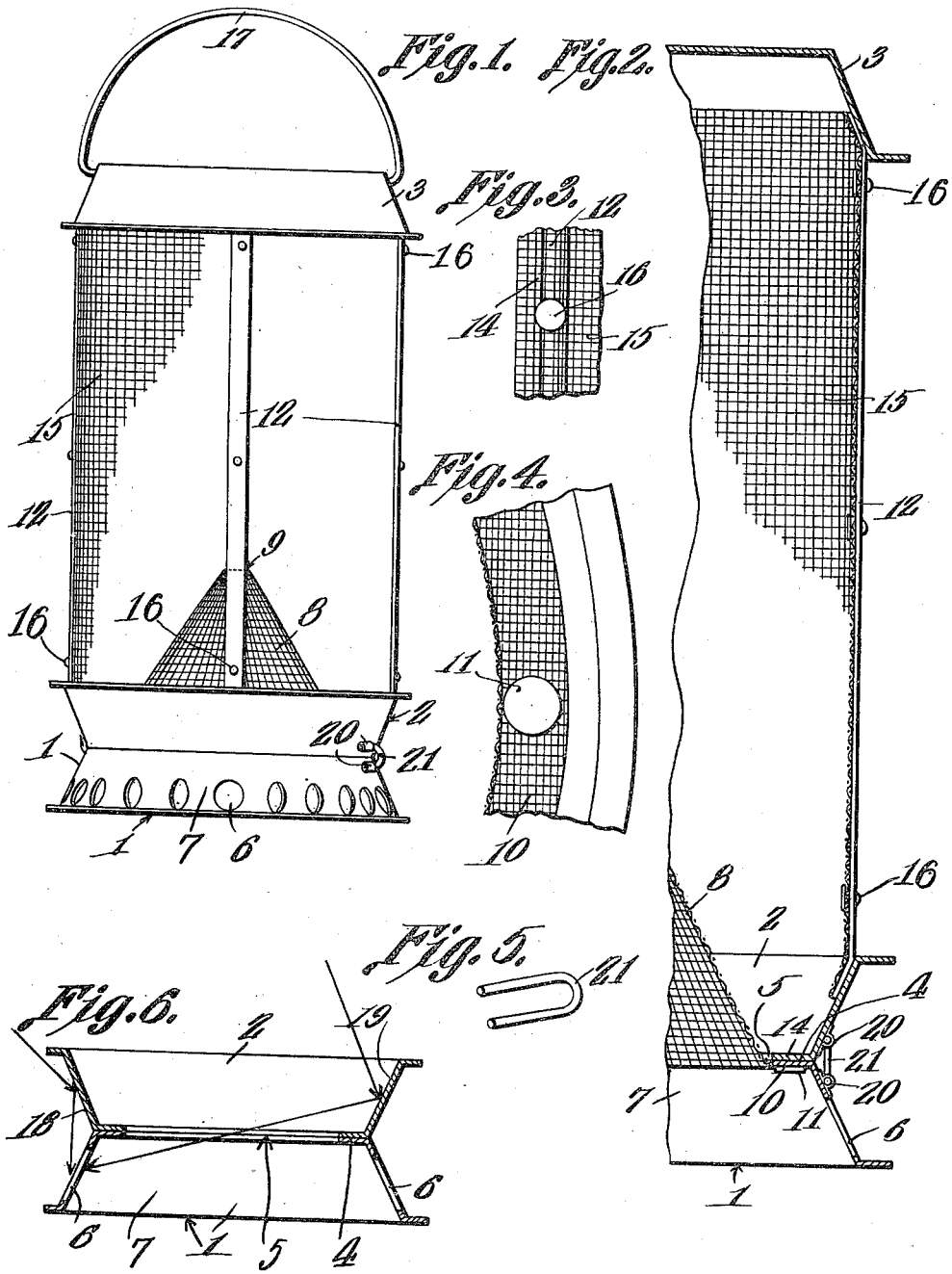

AMERICUS B. AVIS, OF POMONA, CALIFORNIA.

FLY-TRAP.

1,068,557.  Specification of Letters Patent.  Patented July 29, 1913.

Application filed October 21, 1912. Serial No. 727,024.

*To all whom it may concern:*

Be it known that I, AMERICUS B. AVIS, a citizen of the United States, residing at Pomona, in the county of Los Angeles and State of California, have invented a new and useful Fly-Trap, of which the following is a specification.

The device forming the subject matter of this application is a fly trap having a novel arrangement of reflecting surfaces adapted to illuminate the entrance openings of the trap and to illuminate the interior of the trap, so that the flies will be attracted therein.

Another feature of the invention is to provide a fly trap which may be fashioned at trifling expense, out of common milk pans.

The invention aims, further, to improve the construction of devices of that type to which the present invention appertains, and to increase the utility and efficiency thereof.

With the foregoing and other objects in view which will appear as the description proceed, the invention resides in the combination and arrangement of parts, and in the details of construction hereinafter described and claimed, it being understood that changes in the precise embodiment of invention herein disclosed can be made within the scope of what is claimed without departing from the spirit of the invention.

In the drawings:—Figure 1 is an elevation; Fig. 2 is a fragmental longitudinal section; Fig. 3 is a fragmental elevation of the inside of the trap; Fig. 4 is a fragmental bottom plan; Fig. 5 is a perspective of the locking member; and Fig. 6 is a transverse section, diagrammatic in nature.

In carrying out the invention, three pans are provided, these pans being common milk pans, or the ordinary frusto-conical, peripherally flanged form. The pans are of identical construction and of identical dimensions, but for convenience in description, the several pans are designated by separate reference characters, the reference character 1 indicating the primary pan, the reference character 2 indicating the secondary pan, and the reference character 3 indicating the auxiliary pan.

The bases 4 of the primary pan and of the secondary pan 2 are disposed in abutment and are secured together in any desired manner. In the present instance, the pans 1 and 2 are equipped with eyes 20, through which the staples 21 are detachably engaged. The bases 4 of the pans 1 and 2 are provided with registering openings 5, and entrance openings 6 are formed in the side walls 7 of the primary pan 1.

The invention includes a conical, foraminous leader 8, having an opening 9 at its apex, the leader 8 being provided at its lower end with a laterally projecting flange 10 which overlies the lower face of the base 4 of the primary pan 1. Buttons 11 are soldered or otherwise secured to the base 4 of the primary pan 1, the buttons 11 overhanging the flange 11 of the leader, 8, so as to uphold the leader.

The auxiliary pan 3 is inverted above the secondary pan 2, and braces 12 connect the side walls of the pans 2 and 3. A foraminous wall 15 extends around the trap, within the contour of the braces 12 and constitutes a receptacle. By means of rivets 16 or the like, located in the braces 12, the wall 15 is secured to the braces. Ordinarily, the ends of the wall 15 are not secured to the pans 2 and 3. The auxiliary pan 3 may be equipped with a pivoted bail 17.

It is to be observed that when the pans 1 and 2 are secured together in a manner hereinbefore described, an internally open base is provided, which is of hour-glass form. The primary pan 1 constitutes the lower portion of the hour-glass base, and the secondary pan 2 constitutes the upper portion thereof. The outer face 18 of the side wall of the secondary pan 12 is highly polished, to present a reflecting surface, and this reflecting surface overhangs the entrance openings 6 in the side wall 7 of the primary pan 1. The entrance openings 6, therefore, are at all times illuminated, and the flies are attracted thereinto. The interior surface 19 of the side wall of the secondary pan 2 is highly polished, to present a reflecting surface. This reflecting surface is visible through the openings 6, and thereby, the flies will be attracted into the interior of the primary pan 1. Moreover, when the flies are within the primary pan 1, the interior reflecting surface 19 will be visible and will cause the flies to fly upward, into and through the leader 8.

From the foregoing it will be observed that a fly trap is provided which will serve to attract the insects. It is to be noted, further, that the trap may be fashioned out of common materials of commerce, it being necessary to employ but three common milk pans, all of identical constructions and dimensions. The device, therefore, may be fashioned at trifling expense.

Having thus described the invention, what is claimed is:—

1. A fly trap comprising an internally open hour-glass base including a lower portion having an opening and an upper portion having a polished exterior reflecting surface overhanging the opening; a receptacle connected with the upper portion; and a leader within the receptacle, the leader being connected with the base.

2. A fly trap comprising an internally open hour-glass base including a lower portion having openings and an upper portion having a polished exterior reflecting surface overhanging the openings; the upper portion having a polished interior reflecting surface visible through the openings; a receptacle connected with the upper portion; and a leader located within the receptacle and connected with the base.

3. A fly trap comprising a primary pan, a secondary pan and an auxiliary pan, all of the pans being of peripherally flanged, frusto-conical form, and being of identical construction, and dimensions; the primary and secondary pans being secured together, base to base, and being provided with registering openings in their bases, there being openings in the side wall of the primary pan; a conical leader secured about the registering openings; the auxiliary pan being inverted over the secondary pan; braces connecting the secondary pan with the auxiliary pan; and a foraminous wall connected with the braces and extended between the secondary and auxiliary pans.

In testimony that I claim the foregoing as my own, I have hereto affixed my signature in the presence of two witnesses.

AMERICUS B. AVIS.

Witnesses:
JAMES E. BURNHAM,
CHARLES MARSDEN.

---

Copies of this patent may be obtained for five cents each, by addressing the "Commissioner of Patents, Washington, D. C."